(12) United States Patent
Gadkaree et al.

(10) Patent No.: US 9,284,190 B2
(45) Date of Patent: Mar. 15, 2016

(54) ELECTROCHEMICAL HIGH RATE STORAGE MATERIALS, PROCESS AND ELECTRODES

(75) Inventors: Kishor Purushottam Gadkaree, Painted Post, NY (US); James Robert Lim, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 719 days.

(21) Appl. No.: 13/548,515

(22) Filed: Jul. 13, 2012

(65) Prior Publication Data

US 2014/0017568 A1    Jan. 16, 2014

(51) Int. Cl.
| | | |
|---|---|---|
| C01B 31/02 | (2006.01) | |
| H01M 4/587 | (2010.01) | |
| H01M 4/62 | (2006.01) | |
| H01M 10/0525 | (2010.01) | |
| H01M 4/133 | (2010.01) | |

(52) U.S. Cl.
CPC .............. *C01B 31/02* (2013.01); *H01M 4/587* (2013.01); *H01M 4/625* (2013.01); *H01M 10/0525* (2013.01); *H01M 4/133* (2013.01); *Y02E 60/122* (2013.01)

(58) Field of Classification Search
CPC ...................................................... C01B 31/02
See application file for complete search history.

(56) References Cited

U.S. PATENT DOCUMENTS

| | | | |
|---|---|---|---|
| 3,035,989 A | 5/1962 | Mitchell | |
| 3,769,200 A | 10/1973 | Folkins | |
| 4,248,627 A | 2/1981 | Blumenthal et al. | |
| 4,640,744 A | 2/1987 | Howe | |
| 5,030,529 A | 7/1991 | Wada et al. | |
| 5,395,562 A | 3/1995 | Nakagawa et al. | |
| 5,591,545 A | 1/1997 | Miyashita et al. | |
| 5,882,621 A | 3/1999 | Doddapaneni et al. | |
| 5,908,715 A | 6/1999 | Liu et al. | |
| 6,087,043 A | 7/2000 | Tossici et al. | |
| 6,482,547 B1 | 11/2002 | Yoon et al. | |
| 7,008,573 B2 | 3/2006 | Ikeda et al. | |
| 7,348,101 B2 | 3/2008 | Gozdz et al. | |
| 7,465,519 B2 | 12/2008 | Tang et al. | |
| 7,537,682 B2 | 5/2009 | Dailly et al. | |
| 7,722,991 B2 | 5/2010 | Zhang et al. | |
| 8,865,351 B2 * | 10/2014 | Mayes et al. | 429/231.8 |
| 2007/0166617 A1 | 7/2007 | Gozdz et al. | |
| 2009/0111021 A1 | 4/2009 | Yazami et al. | |
| 2009/0297951 A1 | 12/2009 | Katsura et al. | |
| 2010/0215567 A1 | 8/2010 | Sakamoto et al. | |
| 2011/0081577 A1 | 4/2011 | Gozdz et al. | |

OTHER PUBLICATIONS

Novak et al; "High Rate Capability of Graphite Negative Electrodes for Lithium-Ion Batteries"; Journal of the Electrochemical Society, 152 (2) A474-A481 (2005).
Yao et al; "Electrochemical Studies of Graphitized Mesocarbon Microbeads As an Anode in Lithium-Ion Cells"; Journal of Power Sources 114 (2003) 292-297.
Zhang et al; "Tin-Nanoparticles Encapsulated in Elastic Hollow Carbon Spheres for High-Performance Anode Material in Lithium-Ion Batteries" Advanced Materials, 2008, 20, 1160-1165.
PCT Application No. PCT/US2013/049688, Dec. 12, 2013 PCT Search Report.
E. Buiel, et al., "Li-insertion in hard carbon anode materials for Li-ion batteries", *Electrochimica Acta*, 1999, vol. 45, pp. 121-130.
W. Xing et al., "Optimizing Pyrolysis of Sugar Carbons for Use as Anode Materials in Lithium-Ion Batteries", *J. Electrochem. Soc.*, Oct. 1996, vol. 143, No. 10, pp. 3046-3052.
W. Li, et at, "Spherical hard carbon prepared from potato starch using as anode material for Li-ion batteries", *Materials Letters*, 2011, vol. 65, pp. 3368-3370.

* cited by examiner

*Primary Examiner* — Stuart Hendrickson
(74) *Attorney, Agent, or Firm* — John L. Haack; Michael W. Russell

(57) ABSTRACT

A non-activated, majority non-graphitic amorphous carbon material may be produced by supplying a carbonized precursor material, heating the carbonized precursor material in a first heating step at a temperature and for a duration sufficient to produce a heat-treated carbon material that has a specific surface area less than about 500 $m^2/g$ and is less than about 20% graphitic by mass, purifying the heat-treated carbon material, and heating the purified heat-treated carbon material in a second heating step at a temperature and for a duration to produce a non-activated, majority non-graphitic amorphous carbon material that has a specific surface area less than about 500 $m^2/g$ and is less than about 20% graphitic by mass.

12 Claims, 1 Drawing Sheet

ELECTROCHEMICAL HIGH RATE STORAGE MATERIALS, PROCESS AND ELECTRODES

BACKGROUND

1. Field

The present disclosure relates to a carbon materials and methods for producing carbon materials.

2. Technical Background

Carbon materials may be incorporated into the anode of a battery, such as a lithium ion battery. In conventional batteries, graphite is used as an anode material. However, graphite-containing anodes may exhibit poor performance at high battery capacity rates. Accordingly, there is a need for anode materials that have improved performance at high battery capacity rates.

BRIEF SUMMARY

The concepts of the present disclosure are generally applicable to carbon materials and processes for making carbon materials. In accordance with one embodiment, a method for forming a non-activated, majority non-graphitic amorphous carbon is disclosed. Such a method comprises providing a carbonized precursor material, heating the precursor material in a first heating step to produce a heat-treated carbon material having a specific surface area less than about 500 $m^2/g$ and having a graphite content of less than about 20% by mass, purifying the heat-treated carbon material, and heating the purified carbon material in a second heating step to produce a non-activated, majority non-graphitic amorphous carbon material having a specific surface area less than about 500 $m^2/g$ and a graphite content of less than about 20% by mass. The act of purifying may include at least one of (a) treating the heat-treated carbon material with an acidic chemical solution comprising an acidic chemical species, and (b) treating the heat-treated carbon material with a basic chemical solution comprising a basic chemical species.

In accordance with further embodiments, a non-activated, majority non-graphitic amorphous carbon material may be produced by supplying a carbonized precursor material, heating the carbonized precursor material in a first heating step to produce a heat-treated carbon material, purifying the heat-treated carbon material by treating with one or both of an acidic chemical solution and a basic chemical solution, and heating the purified carbon material to produce a non-activated, majority non-graphitic amorphous carbon material. The heat-treated carbon material and the non-activated, majority non-graphitic amorphous carbon material can each be characterized by (i) a specific surface area of less than about 500 $m^2/g$, and (ii) being mostly non-graphitic as measured by a Raman Graphitization Ratio of less than about 2:1 and/or an X-ray Graphitization Ratio of less than about 10:1.

In accordance with another embodiment of the present disclosure, a lithium-ion battery comprises an anode, a cathode and an electrolyte, wherein the anode includes a non-activated, majority non-graphitic amorphous carbon material. Such a non-activated, majority non-graphitic amorphous carbon material may have a specific surface area of less than about 500 $m^2/g$ and may be less than about 20% graphitic by mass. Thus, a majority non-graphitic amorphous carbon material may be both majority non-graphitic and majority amorphous.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

The following detailed description of specific embodiments of the present disclosure can be best understood when read in conjunction with the following drawings, where like structures are indicated with like reference numerals and in which.

DETAILED DESCRIPTION

Figure 1:
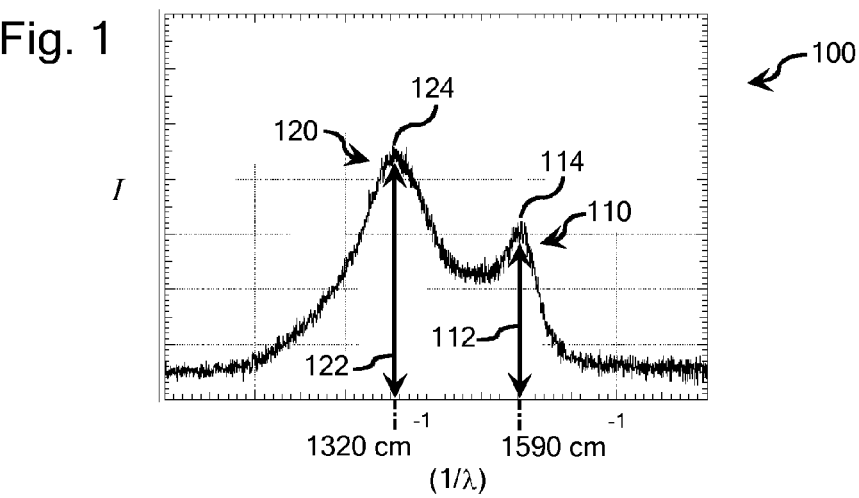
FIG. 1 is a schematic of a Stokes Raman Shift spectrum of an example non-activated, majority non-graphitic amorphous carbon material.

A process for producing a non-activated, majority non-graphitic amorphous carbon material, according to one embodiment, comprises supplying a carbonized (e.g., previously-carbonized) precursor material, heating the carbonized precursor material in a first heating step at a temperature and for a duration effective to produce a heat-treated carbon material, purifying the heat-treated carbon material, and heating the purified heat-treated carbon material in a second heating step at a temperature and for a duration effective to produce a non-activated, majority non-graphitic amorphous carbon material.

In various embodiments, the carbonized precursor may be produced by heating a suitable carbonaceous material at around 800° C. for about 2 hours, followed by cooling at 600° C./hr to room temperature. The carbonized precursor material can be derived, for example, from an edible grain such as wheat flour, walnut flour, corn flour, corn starch, rice flour, and potato flour. Other suitable carbonaceous precursor materials include beets, millet, soybean, barley, and cotton. The carbonized precursor material can be derived from a crop or plant that may or may not be genetically-engineered. The carbonized precursor may be a ground material, such that the average particle size may be about 5 μm.

An exemplary carbonaceous material is wheat flour. Wheat flour is derived by milling wheat kernels, which are the seeds of the wheat plant. Wheat kernels have three main parts: the endosperm, the germ, and the bran. Whole wheat flour contains all three parts of the kernel, while white flour is milled from just the endosperm.

Compositionally, wheat flour contains mostly starch, although additional components are naturally present. The main components in wheat flour, with approximate percentages provided in parentheses, are starch (68-76%), proteins (6-18%), moisture (11-14%), gums (2-3%), lipids (1-1.5%), ash (<0.5%) and sugars (<0.5%).

Starch makes up the bulk of wheat flour. Even bread flour, considered "low" in starch, contains more starch than all other components combined. Starch is typically present in flour as small grains or granules. Chunks of protein bind starch granules together and hold them in place within the endosperm. Glutenin and gliadin, the gluten-forming proteins, typically make up about 80 percent of the proteins in the endosperm. Other proteins in wheat flour include enzymes, such as amylase, protease, and lipase. Other carbohydrates in flour besides starch include gums, specifically pentosan gums. Pentosan gums are a source of soluble dietary fiber. Lipids include oils and emulsifiers, and ash includes inorganic matter (mineral salts), which can comprise iron, copper, potassium, sodium, and zinc.

According to various embodiments, a first heating step (prior to a purification step) and a second heating step (following a purification step) result, respectively, in a heat-treated carbon material and a purified heat-treated carbon material that are non-activated and not substantially graphitized.

As defined herein, a material that is non-activated has a specific surface area less than about 500 m$^2$/g (e.g., less than about 500, 450, 400, 350, 300, 250, 200, 150 or 100 m$^2$/g).

As further defined herein, a material that is not substantially graphitized exhibits at least one of (a) a percent graphitization of less than 20 wt. % (e.g., less than 20, 15, 10, 5, 2 or 1 wt. %), (b) a Raman Graphitization Ratio of less than 2:1 (e.g., less than 2:1 or less than 1:1), or (c) an X-ray Graphitization Ratio of less than 25:1 (e.g., less than 25:1, 10:1, 5:1, 2:1 or 1:1).

The percent graphitization of a material, as measured as a percent of graphite content by weight, can be measured visually, such as by examining a microscopic image of a sample, or by using a transmission electron microscope (TEM) or scanning electron microscope (SEM) to assess the percentage by mass of crystalline content associated with the graphite phase.

The percent graphitization of a material can be measured using Raman spectroscopy. With reference to FIG. 1, the Raman Graphitization Ratio can be determined from by the properties of a Stokes Raman Shift spectrum 100. The Stokes Raman Shift spectrum 100 utilized to determine the Raman Graphitization Ratio is produced with a laser at a defined wavelength, e.g., 785 nm wavelength, and is plotted as intensity (I) versus wavenumber (1/λ).

The Stokes Raman Shift spectrum 100 of the material may comprise an ordered band or graphite band (G-band) 110 with a G-band peak 114 and a defect band (or D-band) 120 with a D-band peak 124. For 785 nm excitation, the G-band peak 114 may be at about 1580-1590 cm$^{-1}$ and the D-band peak 124 may be at about 1320-1360 cm$^{-1}$. The G-band 110 may have a G-band magnitude 112 equal to an intensity of the G-band peak 114 ($I_G$) and the D-band 120 may have a D-band magnitude 122 equal to an intensity of the D-band peak 124 ($I_D$). A ratio of the G-band magnitude 112 to the D-band magnitude 122 ($I_G/I_D$) may be determined therefrom, which is equal to the Raman Graphitization Ratio of a material.

Figure 2:
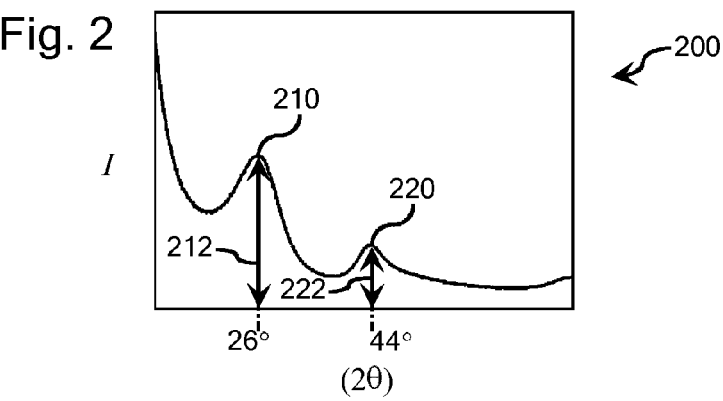
FIG. 2 is a schematic of an X-ray diffraction spectrum of an example non-activated, majority non-graphitic amorphous carbon material carbon material.

The percent graphitization of a material can also be measured using x-ray diffraction. With reference to FIG. 2, the X-ray Graphitization Ratio can be determined from X-ray diffraction spectrum 200. The X-ray diffraction spectrum utilized to determine the X-ray Graphitization Ratio 200 is produced using Cu—K$_\alpha$ radiation, and is plotted as diffracted intensity (I) versus the Bragg angle 2θ.

The X-ray diffraction spectrum 200 of a heat-treated carbon material (after the first heating step) or of a non-activated majority non-graphitic amorphous carbon (after the second heating step) may comprise a first peak 210 at about 26° (corresponding to the (002) basal plane in graphite) and a second peak 220 at about 44° (corresponding to the (101) plane in graphite). The first peak 210 at about 26° may have a magnitude 212 equal to an intensity of the first peak 210 ($I_{002}$) and the second peak 220 at about 44° may have a magnitude 222 equal to an intensity of the second peak 220 ($I_{101}$). A ratio of the magnitude 212 of the first peak 210 at about 26° to the magnitude 222 of the second peak 220 at about 44° may be determined therefrom ($I_{002}/I_{101}$), which is equal to the X-ray Graphitization Ratio of a material.

From the first heating step, the carbonized precursor material may be converted to a heat-treated carbon material. The heat-treated carbon material may be non-activated, as, in one embodiment, the first heating step may comprise heating the carbonized precursor material at a temperature and for a duration sufficient to produce a heat-treated carbon material having a specific surface area less than about 500 m$^2$/g (e.g., less than 500, 450, 400, 350, 300, 250, 200, 150 or 100 m$^2$/g).

As a result of the first heating step, the heat-treated carbon material may be substantially non-graphitic. For example, the first heating step may result in a heat-treated carbon that comprises less than about 20 wt. % graphite, e.g., less than 20, 15, 10, 5, 2 or 1 wt. %. Following the first heating step, the heat-treated carbon may include an amount of graphite ranging from about 0 to 20 wt. %, e.g., 1, 2, 5, 10, 15 or 20 wt. %.

In a related embodiment, the first heating step may comprise heating the carbonized precursor material at a temperature and for a duration sufficient to produce a heat-treated carbon material having a Raman Graphitization Ratio of less than about 2, less than about 1.5, or even less than about 1.

In another embodiment, the first heating step may comprise heating the carbonized precursor material at a temperature and for a duration sufficient to produce a heat-treated carbon material having an X-ray Graphitization Ratio ($I_{002}/I_{101}$) of less than about 25, less than about 10, less than about 5, or even less than about 3.

The first heating step may comprise heating the carbonized precursor material to a temperature ranging from about 800° C. to 1200° C., e.g., 800, 850, 900, 950, 1000, 1050, 1100, 1050 or 1200° C. During the first heating step, the temperature may be ramped up to the desired temperature at a rate, for example, of about 200° C./hr. In one embodiment, the temperature may be held at a maximum temperature for a duration of about 0.5 hour to 12 hours (e.g., about 0.5, 1, 2, 4, 8, 10 or 12 hrs.). The temperature may be decreased at a desired rate, such as, for example, at a furnace rate with a flow of a gas species or combination of gas species such as, for example, N$_2$, He or Ar.

Following the first heating step, the heat-treated carbon material can be purified to produce a purified heat-treated carbon material. The act of purification may comprise rinsing the heat-treated carbon material with one or more chemical solutions comprising one or more acidic chemical species and/or one or more basic chemical species.

Example acidic chemical species include, but are not limited to, HCl, HClO$_4$, HI, HBr, HNO$_3$, H$_2$SO$_4$, CH$_3$COOH, HCOOH, HF, HCN, HNO$_2$, as well as combinations thereof. If used, an acidic chemical species may be in aqueous solution wherein the concentration of the acidic chemical species is from between about 5% and about 50%, e.g., from about 30% to 45%.

Example basic chemical species include, but are not limited to, NH$_4$OH, NaOH, KOH, Ba(OH)$_2$, CH$_3$NH$_2$, C$_5$H$_5$N, as well as combinations thereof. If used, the basic chemical species may be in aqueous solution wherein the concentration of basic chemical species is from between about 5% and 50%, e.g., from about 25% to 35%.

In various embodiments, the heat-treated carbon material may be first treated with at least one chemical solution comprising an acidic chemical species and may then treated with at least one chemical solution comprising a basic chemical species, though the acidic treatment and the basic treatment may occur in any order, such as acidic cleaning followed by basic cleaning or a basic cleaning followed by an acidic cleaning.

The contacting of the acidic solution and/or the basic solution may be for any period of time sufficient to at least partially purify the heat-treated carbon material of impurities. The acidic wash, for example, may remove metallic impurities such as, but not limited to, alkali metals, alkaline earth metals, transition metals, heavy metal impurities, and the basic wash, for example, may remove organic species such as, but not limited to, halogenated compounds, oils, and/or soot.

In one embodiment, the acid washing can remove metallic impurities so that only less than about 300 ppm of metallic impurities remain. In another embodiment, the basic washing can remove organic impurities so that only less than about 300 ppm of organic impurities remain. For example, the contacting of either the acidic and/or basic species may be for about 10 minutes, about 20 minutes, about an hour, about 2 hours, about 4 hours, about 8 hours, about a day, or about several days. The contacting time of the acidic and/or basic species may be for a time period in a range, such as a range defined as between any of the time periods for the contacting time of the acidic and/or basic species disclosed herein.

Without wishing to be bound by theory, it is believed that the acidic washing can remove at least about 50%, at least about 70%, or even at least about 90% of metallic chemical species, and that the basic washing can remove at least about 50%, at least about 70%, or even at least about 90% of organic chemical species. The acidic wash, if performed following the basic wash, can neutralize any acidic species from the acid washing step. The basic wash, if performed following the acidic wash, can neutralize any basic species from the base washing step. The purified heat-treated carbon material may be further rinsed with water following the purification step and prior to the second heating step to remove any residual acid species or basic species.

In the second heating step, the purified heat-treated carbon material may be converted to a non-activated, majority non-graphitic amorphous carbon material. The resulting carbon material may be non-activated, as, in one embodiment, the second heating step may comprise heating the purified heat-treated carbon material at a temperature and for a duration sufficient to produce a non-activated, majority non-graphitic amorphous carbon material having a specific surface area less than about 500 m²/g (e.g., less than 500, 450, 400, 350, 300, 250, 200, 150 or 100 m²/g).

As a result of the second heating step, the purified heat-treated carbon material may be substantially non-graphitic. For example, the second heating step may result in a purified heat-treated carbon that comprises less than about 20 wt. % graphite, e.g., less than 20, 15, 10, 5, 2 or 1 wt. %. Following the second heating step, the purified heat-treated carbon may include an amount of graphite ranging from about 0 to 20 wt. %, e.g., 1, 2, 5, 10, 15 or 20 wt. %.

In a related embodiment, the second heating step may comprise heating the purified heat-treated carbon at a temperature and for a duration sufficient to produce a non-activated, majority non-graphitic amorphous carbon material having a Raman Graphitization Ratio of less than about 2:1, less than about 1.5:1, or even less than about 1:1.

In another embodiment, the second heating step may comprise heating the purified heat-treated carbon at a temperature and for a duration sufficient to produce a non-activated, majority non-graphitic amorphous carbon material having an X-ray Graphitization Ratio of less than about 25:1, less than about 10:1, less than about 5:1, or even less than about 3:1.

The second heating step may comprise heating purified heat-treated carbon material to a temperature ranging from about 800° C. to 1200° C., e.g., 800, 850, 900, 950, 1000, 1050, 1100, 1050 or 1200° C. During the second heating step, the temperature may be ramped up to the desired temperature at a rate, for example, of about 200° C./hr. In one embodiment, the temperature may be held at a maximum temperature for a duration of about 0.5 hour to 12 hours (e.g., about 0.5, 1, 2, 4, 8, 10 or 12 hrs.). The temperature may be decreased at a desired rate, such as, for example, at a furnace rate with a flow of a gas species or combination of gas species such as, for example, $N_2$, He or Ar.

From the foregoing, it will be understood that the various process temperatures and durations during each of the first and second heating steps, as well as the ranges thereof, the percent graphite in the carbon material(s), Raman Graphitization Ratios, and X-ray Graphitization Ratios, including their respective ranges, may be combined in any suitable combination using any one or more of the above-named properties and/or conditions.

The present disclosure also relates to a non-activated, majority non-graphitic amorphous carbon material produced by the process comprising the acts of supplying a carbonized precursor material, heating the carbonized precursor material in a first heating step at a temperature and for a duration sufficient to produce a heat-treated carbon material, purifying the heat-treated carbon material in a purification step to produce a purified heat-treated carbon material, and heating the purified heat-treated carbon material in a second heating step at a temperature and for a duration sufficient to produce a non-activated, majority non-graphitic amorphous carbon material.

In an example method, wheat flour was carbonized by ramping to 800° C. at 150° C/hr, holding at 800° C. for 2 hours, and cooling at 600° C/hr to room temperature under constant flowing $N_2$. The carbonized precursor material was ground to an average particle size (d50) of less than 5 microns. The carbonized precursor material was loaded into a model 1212 CM retort furnace and heated to 1000° C. at a heating rate of 200° C/hr, held at 1000° C. for 2 hr, and then cooled to room temperature. The resulting heat-treated carbon material was treated by soaking overnight in HCl and then soaking a second night in ammonium hydroxide. After the purification steps, the carbon was heat-treated at 1000° C. for 2 hours in nitrogen. The BET specific surface area of the resulting material was about 12.6 m²/g. The particle size distribution data for the non-activated, majority non-graphitic amorphous carbon material is summarized in Table 1.

TABLE 1

Characterization of non-activated, majority non-graphitic amorphous carbon.

| | PSD (microns) | | |
|---|---|---|---|
| | d10 | d50 | d90 |
| | 0.797 | 4.66 | 10.13 |
| BET (m2/g) | | 12.58 | |
| SEM | | particle-shaped | |

TABLE 1-continued

Characterization of non-activated, majority
non-graphitic amorphous carbon.

| | PSD (microns) | | |
|---|---|---|---|
| | d10 | d50 | d90 |
| | 0.797 | 4.66 | 10.13 |
| XRD | Amorphous carbon | | |
| Raman | graphitic grain size <5 nm | | |
| TEM | amorphous (no domains) | | |

The non-activated, majority non-graphitic amorphous carbon material described herein may be suitable for use as an electrode in an electrochemical storage device, such as, but not limited to, a battery, ultracapacitor, or any other electrochemical storage devices that may utilize carbon-based electrodes. Such electrodes may include an active carbon material that may be formed over one or two sides of a current collector, optionally via an intermediate conductive carbon coating or other adhesion layer. For example, the non-activated, majority non-graphitic amorphous carbon material may function as an electrode in a lithium-ion battery or lithium-ion ultracapacitor and may allow for high lithium-ion charge rates. In one embodiment, the majority non-graphitic amorphous carbon material described herein may function as the electrochemically-active component within an anode.

Figure 3:
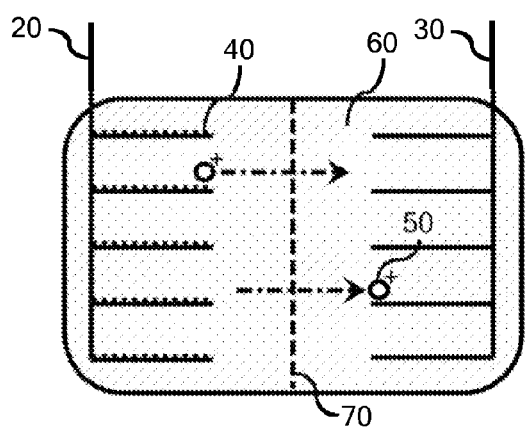
FIG. 3 is a schematic diagram of a lithium-ion battery.

An example schematic of a lithium-ion battery is illustrated in FIG. 3. The lithium-ion battery 10 includes an anode 20, a cathode 30, and an electrolyte 60, wherein the anode 20 comprises an active component 40 that includes a non-activated, majority non-graphitic amorphous carbon material as disclosed herein. During operation of such a battery, ions 50 may pass through the electrolyte 60, from the anode 20 to the cathode 30, across a separator 70.

Figure 4:
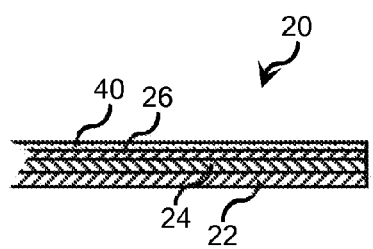
FIG. 4 is a schematic diagram of the anode of the lithium-ion battery of FIG. 3.

The architecture of anode 20 from FIG. 3 is shown in further detail in FIG. 4. The anode 20 may comprise, in layer form, a current collector 22, an optional conductive intermediary coating 24, a lithium component 26, and an electrochemically active component 40. In various embodiments, the active component 40 within anode 20 may comprise from about 0.1 wt. % to about 100 wt. % (e.g., from about 1 wt. % to 99 wt. % or from about 10 wt. % to 90 wt. %) of the non-activated, majority non-graphitic amorphous carbon material as disclosed herein.

In various embodiments, the anode active material may further comprise at least one binding agent and/or adhesion agent. Example binding and/or adhesion agents include, but are not limited to, polytetrafluoroethylene (PTFE), polyvinylidene fluoride (PVDF), polyvinylpyrrolidone (PVP), polyvinyl acetate (PVA), polyethylene oxide (PEO), polypropylene, polyethylene, polyurethane and polyacrylates. The binding and/or adhesion agent may comprise from about 0.01 wt. % to about 50 wt. % of the active component 40, for example from about 0.1 wt. % to about 49 wt. %, or from about 1 wt. % to about 40 wt. %, such as about 10 wt. %.

In various embodiments, the active component 40 may further comprise at least one conduction enhancing agent, such as carbon black, metallic nanotubes, rods, wires, and asymmetric shapes; carbon nanotubes, rods, scrolls, and wires; graphene scrolls and sheets; graphite (natural or synthetic); conductive nanoparticles; and conductive polymers. The conduction enhancing agent may comprise from about 0.01 wt. % to about 50 wt. % of the active coating, for example about 0.1 wt. % to about 49 wt. %, from about 1 wt. % to about 45 wt. %, such as about 5 wt. %.

Anode electrode materials, such as the lithium component 26 of the anode, may be single-side or double-side laminated onto Cu or other lithium stable metal alloy-type current collectors 22 via a conductive carbon intermediary (adhesion) coating 24. The conductive intermediary layer, if used, may comprise about 30-60 wt. % of carbon black particles having an average particle size of between about 0.1 μm and about 1 μm, and about 30-60 wt. % of graphite particles having an average particle size of between about 5 μm and about 50 μm. A variety of polymeric binders can further be incorporated herein.

Example cathode active materials for battery (device) fabrication, include but are not limited to, $LiTiS_2$, $LiCoO_2$, $LiNi_{1-y}Co_yO_2$, $LiNi_yMn_yCo_{1-2y}O_2$, $LiFeO_2$, $LiFePO_4$, $LiN_2O_5$, $LiV_6O_{13}$, $LiNi_{1-y}Co_yO_2$, $LiMn_2O_4$, $LiMnO_2$, $LiNi_{1-y-z}Co_yAl_zO_2$, $LiNi_{1-y}Mn_yO_2$, and $LiNi_{1-y}Mn_{1-y}Co_{2y}O_2$.

Electrolytes may comprise mixtures of salts and solvents. The lithium salt can be selected from the group consisting of, but not limited to, lithium hexafluorophosphate ($LiPF_6$), lithium tetrafluoroborate ($LiBF_4$), lithium hexafluoroarsenate ($LiAsF_6$), lithium perchlorate ($LiClO_4$), lithium triflate ($LiCF_3SO_3$), lithium bis(trifluoromethanesulfone) imide ($LiN(SO_2CF_3)_2$), lithium bis(perfluoroethylsulfonyl)imide ($LiN(SO_2CF_2CF_3)_2$), lithium bis(oxalatoborate) (LiBOB), lithium bis(pentafluoroethylsulfonyl)imide (LiBETI), lithium bis(trifluoromethylsulfonimide) (LiTFMSI), and combinations thereof.

The solvent may be selected from the group consisting of acetonitrile, 1,3-dioxolane, ethylene carbonate, propylene carbonate, butylene carbonate, dimethyl carbonate, diethyl carbonate, ethylmethyl carbonate, dimethoxyethane, propylmethyl carbonate, and combinations thereof. A concentration of the lithium salt in the electrolyte can range from about 0.5 to 2 M.

As used herein, "specific capacity" (mAh/g) refers to the total quantity of charge or total ampere-hours available per weight of active material. The "initial specific capacity loss" refers to the specific capacity difference from a first charge to a second charge. The "C" value or "C-rating" (measured in amps) is the capacity of a material (Ah) divided by 1 hour (h). Many portable batteries, for instance, are rated at 1 C. A discharge of 1 C draws a current equal to the rated capacity. By way of example, a battery rated at 1000 mAh provides 1000 mA for one hour if discharged at 1 C rate. The same battery discharged at C/2 provides 500 mA for two hours. At 2 C, the same battery delivers 2000 mA for 30 minutes. The "reversible specific capacity" (mAh/g) refers to the specific capacity retained over multiple cycles at a constant C-rating and voltage cut-off window.

Anodes comprising the non-activated, majority non-graphitic amorphous carbon material were evaluated using a 1:1 ratio of ethylene carbonate (EC) to dimethyl carbonate (DMC) in $LiPF_6$ (1M). The carbon material was combined with PVDF binder and n-methyl pyrrolidone, cast, dried and calendared to form solid sheets. The test configuration used a Whatman GF/F separator, and a three electrode configuration. The three electrode configuration included an anode material working electrode, a lithium metal counter electrode, and a lithium metal reference electrode, with a stack pressure of 5 psi.

Five identical cells were prepared for each carbon material and cycled at C/5 (in and out for the first three cycles, except the first cycle was intercalated at C/20 until a solid electrolyte interphase (SEI) formed (400 mV) followed by C/5 cycling using a potential window of 0.7 to 0.01 volts. The solid electrolyte interphase is a passivating layer that forms at the carbon anode surface, mostly during the first cycle, due to the reducing properties of graphite, which reductively decomposes the electrolyte. Cell impedance was measured at the beginning of each test. The initial capacity loss and reversible capacities were measured.

In one series of tests, the non-activated, majority non-graphitic amorphous carbon material exhibited an average reversible specific capacity of about 254 mAh/g. The initial specific capacity loss was measured at about 80 mAh/g. In various embodiments, the non-activated, majority non-graphitic amorphous carbon material may have an average reversible specific capacity of between about 200 mAh/g and about 300 mAh/g, and may have less than about 100 mAh/g initial specific capacity loss. In further embodiments, the non-activated, majority non-graphitic amorphous carbon material may have an average reversible specific capacity of between about 150 mAh/g and about 400 mAh/g, and may have less than about 120 mAh/g initial specific capacity loss.

Multiple electrode cells were fabricated and tested over a range of C-rates. The Li-ion C-rates were varied: 0.4, 1, 2, 4, 6, 8, 10, 20 and 40. The Li-out rate was maintained at about 0.4 C in all tests to assure that all Li was extracted between cycles. In embodiments, the non-activated, majority non-graphitic amorphous carbon material may have a charge capacity retention of greater than or equal to about 80% at a 1 C rate. In embodiments, the non-activated, majority non-graphitic amorphous carbon material may have a charge capacity retention of greater than or equal to about 75% at a 2 C rate. In further embodiment, the non-activated, majority non-graphitic amorphous carbon material may have a charge capacity retention greater than or equal to about 40% at 5 C. In still further embodiments, the non-activated, majority non-graphitic amorphous carbon material may have a charge capacity retention greater than or equal to about 20% at 10 C.

The charge capacity retention of the non-activated, majority non-graphitic amorphous carbon material may be characterized by a percent retained charge of at least 80% at a 1 C rate, at least 75% at a 2 C rate, at least 40% at a 5 C rate, and at least 20% at a 10 C rate.

For the purposes of describing and defining the present invention it is noted that the terms "substantially", "approximately" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that terms like "commonly" when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims.

The invention claimed is:

1. A process for producing a non-activated, majority non-graphitic amorphous carbon material, the process comprising:
    providing a carbonized precursor material;
    heating the carbonized precursor material in a first heating step at a temperature ranging from about 800° C. to about 1200° C. and for a duration ranging from about 0.5 hours to about 12 hours to produce a non-activated, heat-treated carbon material;
    purifying the non-activated, heat-treated carbon material to produce a purified heat-treated carbon material by washing the non-activated, heat-treated carbon material with at least one of an acidic chemical solution comprising an acidic chemical species and a basic chemical solution comprising a basic chemical species; and
    heating the purified heat-treated carbon material in a second heating step at a temperature and for a duration sufficient to produce a non-activated, majority non-graphitic amorphous carbon material that has a specific surface area less than about 500 m$^2$/g and is less than about 20% graphitic by mass.

2. The process of claim 1, wherein the non-activated, majority non-graphitic amorphous carbon has a Raman Graphitization Ratio of less than about 2:1.

3. The process of claim 1, wherein the non-activated, majority non-graphitic amorphous carbon has a X-ray Graphitization Ratio of less than about 25:1.

4. The process of claim 1, wherein the non-activated, majority non-graphitic amorphous carbon material is less than about 10% graphitic by mass.

5. The process of claim 1, wherein the acidic chemical species is selected from the group consisting of HCl, HClO$_4$, HI, HBr, HNO$_3$, H$_2$SO$_4$, CH$_3$COOH, HCOOH, HF, HCN, HNO$_2$ and combinations thereof.

6. The process of claim 1, wherein the basic chemical species is selected from the group consisting of NH$_4$OH, NaOH, KOH, Ba(OH)$_2$, CH$_3$NH$_2$, C$_5$H$_5$N and combinations thereof.

7. The process of claim 1, wherein the purifying comprises rinsing the non-activated, heat-treated carbon material with the acidic chemical solution prior to rinsing the non-activated, heat-treated carbon material with the basic chemical solution.

8. The process of claim 1, further comprising rinsing the purified heat-treated carbon material with water prior to the second heating step.

9. The process of claim 1, wherein during the second heating step the purified heat-treated carbon material is heated in an inert gas environment comprising at least one gas selected from the group consisting of N$_2$, He and Ar.

10. The process of claim 1, wherein the temperature of the second heating step is between about 800° C. and 1200° C.

11. The process of claim 1, wherein the duration of the second heating step is between about 0.5 and 12 hours.

12. A process for producing a non-activated, majority non-graphitic amorphous carbon material, the process comprising:
    providing a carbonized precursor material;
    heating the carbonized precursor material in a first heating step at a temperature ranging from about 800° C. to about 1200° C. and for a duration ranging from about 0.5 hours to about 12 hours to produce a non-activated, heat-treated carbon material;

purifying the non-activated, heat-treated carbon material to produce a purified heat-treated carbon material by washing the non-activated, heat-treated carbon material with at least one of an acidic chemical solution comprising an acidic chemical species and a basic chemical solution comprising a basic chemical species; and heating the purified heat-treated-carbon material in a second heating step at a temperature and for a duration sufficient to produce a non-activated, majority non-graphitic amorphous carbon material that has a specific surface area less than about 500 m$^2$/g and has at least one of a Raman Graphitization Ratio of less than about 2:1 and an X-ray Graphitization Ratio of less than about 25:1.

* * * * *